Patented Sept. 19, 1922.

1,429,714

UNITED STATES PATENT OFFICE.

CHARLES B. CHATFIELD, OF ORANGE, NEW JERSEY.

PROCESS OF MAKING SUBSTITUTED AMINES.

No Drawing.   Application filed March 5, 1919. Serial No. 280,809.

*To all whom it may concern:*

Be it known that I, CHARLES B. CHATFIELD, a citizen of the United States, and a resident of Orange, in the county of Essex and State of New Jersey, have invented certain new and useful Improvements in Processes of Making Substituted Amines, of which the following is a specification.

My invention relates to processes for making substituted amines generally but it is particularly applicable to the making of amines of the aromatic group in which an alkyl radical is substituted.

It has heretofore been proposed to heat aniline and ethyl bromide under a reflux condenser to produce monoethylaniline hydrobromide and then treating the mass with caustic soda solution to liberate monoethylaniline oil and then, after separating the oil from the resulting sodium bromide, heating the oil again with ethyl bromide to produce di-ethylaniline hydrobromide which may be treated with caustic soda solution to produce di-ethylaniline. In each step however, an excess of ethylbromide is required and the mono-ethylaniline hydrobromide is produced as a solid mass which is difficult to handle and the temperature must be kept down approximately to the boiling point of the ethylbromide or it will be too quickly boiled away from the aniline. Also this method requires a very large and expensive condensing apparatus and the amine is only partially substituted, the di-ethylaniline produced containing a large percentage of the mono-ethylaniline and aniline. Other methods have also been proposed, which, however involve the use of expensive apparatus which is expensive to maintain. These methods also involve relatively large labor costs and a relatively large waste of reagents.

Various objects of my invention are to provide a process which produces much higher yields of a purer material, which is easy in manipulation, which requires only inexpensive apparatus, inexpensive to maintain and in which the losses of materials are reduced to a minimum. Further and more specific objects, features and advantages will more clearly appear from the detail description given below.

While the invention, in its broader aspects, may be applied to the production of various of the substituted aliphatic and aromatic amines, it is especially useful in the manufacture of alkyl amines from the aromatic amines and, I will therefore, give a specific example of my improvements as I prefer to use them in the making of one of the alkylamines from the aromatic amine, which description will enable those skilled in the art to fully understand the invention and apply it to the making of substituted amines generally.

Example: Into a suitable vessel I put 250 parts (by weight) of ethylbromide and into another suitable vessel I put 62.5 parts (by weight) of aniline and 375 parts (by weight) of a water solution of caustic soda containing 37% NaOH (by weight). The first vessel is closed to the atmosphere and a pipe or conduit is provided, leading from the top thereof and down to near the bottom of the second vessel. When quiescent the caustic soda solution and the aniline separate out into layers in the second vessel and the pipe or conduit extends down into the second vessel below the top of the caustic soda solution which sinks to the bottom. The ethylbromide in the first vessel is heated to about its boiling point in any suitable manner and the materials in the second vessel are gently heated in any suitable manner to about 85° C. or sufficient to cause a thorough reaction to produce the substituted amine when treated with the bromide as described below. This heating may be accomplished by means of hot water or steam jackets. The ethyl bromide is distilled off from the first vessel and the fluid vapors thereof pass through the pipe or conduit and are forced into and through the cautic soda solution and aniline causing the same to be thoroughly stirred and mixed and the ethylbromide vapors to be brought into contact with all parts of the aniline. By heating the second vessel the ingredients are kept at sufficient temperature to cause a thorough reaction between the ethylbromide and aniline. The reactions which occur are believed to be as follows:

ethylbromide+aniline=
           mono-ethylaniline hydrobromide
$C_2H_5Br + C_6H_5NH_2 =$
           $C_6H_5NH(C_2H_5)HBr$
mono-ethylaniline hydrobromide+
           caustic soda=mono-ethylaniline
$C_6H_5NH(C_2H_5)HBr + NaOH =$
           $C_6H_5NH(C_2H_5) + NaBr + H_2O$ mono-ethylaniline+ethylbromide=
  di-ethylaniline hydrobromide
$$C_6H_5NH(C_2H_5)+C_2H_5Br=$$
$$C_6H_5N(C_2H_5)_2HBr$$
Di-ethylaniline hydrobromide+
  caustic soda=di-ethylaniline
$$C_6H_5N(C_2H_5)_2HBr+NaOH=$$
$$C_6H_5N(C_2H_5)_2+NaBr+H_2O$$

The second vessel is closed to the atmosphere and has a pipe or conduit leading from the top thereof to a separator which returns to the second vessel any of the amine products or caustic solution which would otherwise be carried off by the escaping vapors. Any ethylbromide vapors which pass through the aniline without reacting pass through the separator to a condenser where they are condensed and recovered for reuse. The whole operation is however, carried out at substantially atmospheric pressure so there is little tendency for the vapors to leak out into the atmosphere and be lost.

By the time the etylbromide in the first vessel has all been distilled off and bubbled up through the caustic solution and aniline, the aniline is converted into an oil containing about 85% by weight of di-ethylaniline and 15% by weight of mono-ethylaniline with a corresponding consumption of ethylbromide and formation of sodium bromide.

The oil is separated from the caustic soda and sodium bromide solution by gravity, the aqueous solution being preferably run off at the bottom leaving only the oil in the second vessel. The ethylbromide condensed as above described is returned to the first vessel and the distillation renewed and the operation repeated except that during this second step the oil in the second vessel is maintained at about 140° C. When all the ethylbromide is thus again distilled and passed into and through the oil, the oil in the second vessel is thoroughly shaken with the caustic soda and sodium bromide solution which was previously withdrawn therefrom, to neutralize the hydrobromic acid formed. The oil is again separated from the caustic soda and sodium bromide solution by gravity and steam distilled in any suitable or well-known manner for purposes of purification. By using a basic metal compound such as caustic alkili as neutralizing agent I avoid the production of various aliphatic amines such as would be produced if ammonia were used. Furthermore if ammonia were used the reaction would have to be carried out in a closed vessel to get any substantial yield.

By the method described I have been able to obtain a yield of 90% of the theoretical quantity of di-ethylaniline possible, and the product gave a drop in temperature by the well-known acetic anhydride test of 1° indicating the presence of no aniline or mono-ethylaniline, the said test being described in Technical Methods of Chemical Analysis by Lunge, vol. 2, part 2, pages 871–872, translation by Keane, published by D. Van Nostrand Company 1911. I found the ethylbromide consumed during the reactions to be about 166 parts, but by reconverting the sodium bromide back to ethylbromide in any suitable manner, as by the ordinary sulphuric acid and alcohol method, and condensing the vapors of ethylbromide that pass off from the batch, about 82% of the otherwise lost ethylbromide is saved and recovered for reuse. In addition to the di-ethylaniline oil obtained as above described about 5% of oil may be recovered by fractionation from the ethylbromide condensed, making the total yield about 95% and the degree of conversion practically 100%.

It will be obvious that many changes and modificatons may be made and the invention embodied in widely differing forms and that many changes will be required depending upon the particular amine being substituted and the particular halide used, all of which will be readily understood by those skilled in the art.

As examples of other amines which may be substituted according to my invention, I may mention the following: Aniline may be treated with methyl iodide to produce mono and di-methylaniline. Toluidine may be treated with methyl iodide to produce mono and di-methyltoluidine and xylidine may be treated with ethyl chloride to produce mono and di-ethyl xylidine, and the temperatures and methods of applying heat will naturally be varied according to the specific conditions and boiling points of the materials being treated and produced. Other suitable neutralizing agents such as sodium carbonate may be used instead of the caustic alkali. If mono-ethyl compounds are to be produced I prefer to carry out the first step without the alkali but with the amine dissolved in a non-hydrolizing solvent, whereas if only di-ethyl compounds are desired, I use the alkali in the first step or in the second step or both, but not necessarily in both. Suitable solvents for the amines may be used to facilitate the reaction or to aid in stopping it at any point desired. Also it is not necessary that the alkyl-halogen compounds or amines be pure. Alkyl halogen compounds and amines containing ethers, alcohols and the like may be used instead of the pure compounds, since no false pressure is created thereby which might be dangerous or affect the reaction, as might be the case if the reaction were carried out under pressure as in an autoclave. Also I may use different solvents to aid in establishing the end of the reaction by preventing the precipitation of the product as formed, thus removing it from the reaction phase. Also under certain circumstances it may be convenient to pass the alkyl-halogen vapor directly from the still in which it is made to the second vessel above mentioned or through a number of such vessels in series and the alkyl-halogen may be gradually added in other forms and ways. Where an alkyl halide is used which is gaseous at ordinary temperatures it may, if desired, be condensed first or it may be passed through the amine without first condensing it.

If desired the liquid halides may be forced through the amines with an air jet and in such case solid caustic soda (as distinguished from caustic in aqueous solution) might be used, as such a jet would be capable of sufficiently stirring up the mixture. It is also apparent that the halide may be introduced in a stream or spray into the mass of amine and permitted to vaporize in whole or in part therein and the introduction may be continuous or intermittent.

According to my invention in its preferred form the temperature to which the amine to be substituted may be raised, is not limited to the boiling point of the halide, and I am enabled to carry on the process in a most simple and efficient manner at or near atmospheric pressure, and at a temperature above that which has been practicable with certain prior methods so that I am able to obtain more complete reactions and purer products.

Having thus fully described my improvements, what I claim and desire to secure by Letters Patent, is:—

1. In the process of making substituted amines, the step which consists in providing a batch of the amine and caustic alkali and causing a bromide of the substituting radical to gradually react with the amine at atmospheric pressure, the caustic alkali acting to neutralize the hydro-halogen substantially as formed.

2. In the process of making substituted amines, the step which consists in gradually adding a bromide of the substituting radical from an outside source to a mass of the amine and in the presence of caustic soda to neutralize the hydro-halogen compound formed.

3. In the process of making substituted amines the step which consists in providing a batch of aniline and caustic alkali, and bringing ethyl bromide gradually into reactive contact with the aniline at substantially atmospheric pressure, the caustic alkali acting to neutralize the hydro-halogen compound substantially as formed.

Signed at New York, in the county of New York and State of New York, this 4th day of March A. D. 1919.

CHARLES B. CHATFIELD.